United States Patent [19]

Gurak et al.

[11] Patent Number: 4,981,371

[45] Date of Patent: Jan. 1, 1991

[54] INTEGRATED I/O INTERFACE FOR COMMUNICATION TERMINAL

[75] Inventors: Richard J. Gurak, Summit; Robert Goeb, Spotswood, both of N.J.

[73] Assignee: ITT Corporation, New York, N.Y.

[21] Appl. No.: 312,508

[22] Filed: Feb. 17, 1989

[51] Int. Cl.⁵ .................. H04L 9/00; H04M 11/06
[52] U.S. Cl. ........................... 380/49; 379/96; 370/110.1; 370/125
[58] Field of Search ............ 380/9, 49, 50, 59; 364/180, 200, 900; 379/96; 370/60, 67, 85.1, 85.9, 94.1, 125, 110.1-111

[56] References Cited

U.S. PATENT DOCUMENTS

| 4,180,860 | 12/1979 | Driscoll et al. | 364/900 |
|---|---|---|---|
| 4,199,809 | 4/1980 | Pasahow et al. | 364/200 |
| 4,425,664 | 1/1984 | Sherman et al. | 364/200 X |
| 4,554,658 | 11/1985 | Marten et al. | 370/85.1 |
| 4,638,451 | 1/1987 | Hester et al. | 364/900 |
| 4,750,111 | 6/1988 | Crosby, Jr. et al. | 364/200 |
| 4,813,040 | 3/1989 | Futato | 370/111 |

FOREIGN PATENT DOCUMENTS

0222544 5/1987 European Pat. Off. ............ 370/125
3717315 12/1988 Fed. Rep. of Germany ...... 370/125

Primary Examiner—Stephen C. Buczinski
Assistant Examiner—Bernarr Earl Gregory
Attorney, Agent, or Firm—Arthur L. Plevy

[57] ABSTRACT

An integrated I/O interface for a communication terminal, connectable with an external analog communication device and with an external digital communication device, includes an I/O interface subsystem having analog and digital arrays, a first connector for connecting the I/O interface subsystem to a digital processor for the terminal, and a second connector for connecting the I/O interface subsystem to both the analog communication device and the digital communication device. The digital array and the analog array including a CODEC are mounted on a platform carrier on the I/O interface subsystem board. The second connector is a single connector having pins for transmitting the analog signals, pins for the digital signals, a pin indicating whether the analog or digital mode is selected, and a pin indicating which external communication device is selected. The second connector also has common EMI and EMP protective filter circuits incorporated therein to protect the I/O interface subsystem.

15 Claims, 6 Drawing Sheets

INTEGRATED I/O INTERFACE FOR COMMUNICATION TERMINAL

FIELD OF INVENTION

This invention was conceived and reduced to practice under a U.S. Government contract--namely, MDA904-86-C-7702 C-7702.

The present invention relates to an input/output (I/O) interface for connecting a communication terminal to a communication device, and, more particularly, to an integrated I/O interface installed in a voice and data terminal which interfaces with external communication devices transmitting in analog and digital modes.

BACKGROUND OF INVENTION

In conventional communication systems, a communication terminal is connected to different external communication devices through separate I/O ports or connectors. In high-security military applications, a secure voice and data terminal (SVDT) has heretofore used discrete interface sections to interface with external communication devices for audio (analog) signals and for digital signals separately. Voice and/or data signals are processed digitally in the SVDT through a processor subsystem upon input from, or for output to, a digital I/O interface section connected to an external digital device for digital transmission, and to an analog I/O interface section connected to an external analog device for radio transmission.

The current SVDT system has the problem that the separate analog and digital I/O interface sections require separate installation within or outside of the terminal, thereby requiring considerable space to accommodate the interconnected parts. Moreover, when protective filter or isolator circuits for electromagnetic interference (EMI) and electromagnetic pulse transients (EMP) are provided between each interface section and the SVDT processor subsystem on one side, and the external device on the other side, the number of EMI and EMP circuits are multiplied.

SUMMARY OF INVENTION

In order to overcome the problems of conventional systems, it is a principal object of the invention to provide an integrated I/O interface for a communication terminal which handles both analog and digital I/O interface functions and which reduces the amount of space that would be taken up by separate interface sections. It is a further object to provide the integrated I/O interface as a single unit with a single connector to the external communication devices, and to provide EMI and EMP protection for the analog and digital I/O interfaces using a reduced number of protective circuits.

In accordance with the invention, an integrated I/O interface, connectable with an external analog communication device and with an external digital communication device, for a communication terminal having a digital processor for handling voice and/or data signals, comprises: an I/O interface subsystem installed in the terminal; first connecting means for connecting the I/O interface subsystem to the digital processor of the terminal; second connecting means for connecting the I/O interface subsystem to the external analog communication device and to the external digital communication device; means in said I/O interface subsystem providing a digital interface mode, including a digital array connected between said first and second connecting means for interfacing digital signals to/from the terminal digital processor with digital signals to/from the external digital communication device; and means in said I/O interface subsystem providing an analog interface mode, including an analog array connected between said first and second connecting means for interfacing digital signals to/from the terminal digital processor with analog signals to/from said external analog communication device.

In a preferred embodiment of the invention, the digital array and the analog array including a CODEC are mounted on one platform carrier which in turn is mounted on a printed circuit board for the I/O interface subsystem. The second connecting means is a single connector having a plurality of pins, including a first subplurality of pins for transmitting the analog signals, a second subplurality of pins for transmitting the digital signals, and one pin which carries either a logic "1" or "0" signal indicating whether the external analog communication device or the external digital communication device is selected for connection to the I/O interface subsystem. The single connector also incorporates protective EMI and EMP filter circuits in common to the digital and analog arrays of the I/O interface.

BRIEF DESCRIPTION OF DRAWINGS

The above objects and further features and advantages of the invention are described in detail below in conjunction with the drawings, of which.

DETAILED DESCRIPTION OF INVENTION

The present invention concerns an integrated I/O interface for a communication terminal which is connectable to an external analog communication device and an external digital communication device. In the following description, the integrated I/O interface is applied to a secure voice and data terminal (SVDT) used in high-security military environments, such as for a data-encrypted telephone terminal, for transmission, alternatively, to/from a digital modem, a LOS modem (radio) or a high frequency modem (radio). However, it is to be understood that the integrated I/O interface can be equally applied to other environments in which a communication terminal is connected to two or more different external communication devices.

Figure 1:
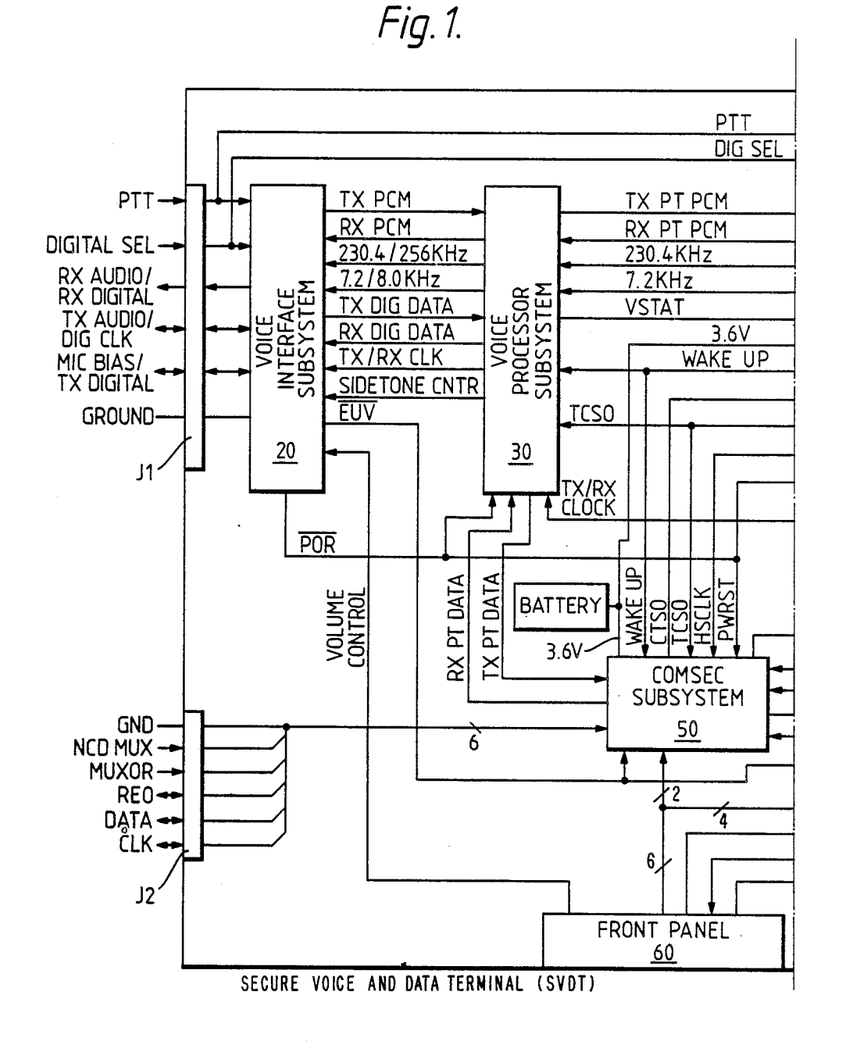
FIG. 1 is a schematic diagram of a communication terminal provided with an integrated I/O interface unit in accordance with the invention.

Referring to FIG. 1, a secure voice and data terminal (SVDT) 10 is configured for communication, on one side, from/to a voice-handling device, such as a telephone or microphone, indicated at port J1, and a data-handling device, indicated at port J2, and, on the other side, alternative analog and digital communication channels through port J3. Voice signals transmitted through port J1 are passed through a voice interface subsystem 20, which converts the voice signals to/from digital (pulse code modulated) form, a voice processor subsystem 30, which performs encryption and related other functions on the digitized voice signals, and a modem processor subsystem 40, which digitally processes the encrypted, digitized voice signals for external transmission. Data signals transmitted through port J2 are passed through a COMSEC subsystem 50, which performs encryption and related other functions on the data signals, then through the modem processor subsystem 40.

The SVDT terminal 10 has a front panel 60 of its chassis for visual display and manual push-button control of its communication functions, including volume control of the voice-handling device. The terminal 10 is connected to a battery power source 61 through port J4 which provides +28 VDC to a power control unit 62. The power control unit 62 is turned On/Off by a switch on the front panel 60.

An I/O interface section 70 is installed in the terminal for I/O interface functions between encrypted, digitized voice/data signals to/from the modem processor subsystem 40 and alternative external communication devices through port J3. The external communication devices include a high frequency modem (radio) and a LOS modem (radio) for analog transmission, and a digital modem for digital transmission. The I/O interface section 70 includes an I/O interface subsystem which interfaces between internal I/O port 72 connected to the modem processor subsystem 40, and external I/O port J3 connected to the external analog and digital communication devices. The I/O interface section 70 also includes a DC/DC converter 73 which provides a stable voltage to the I/O interface subsystem 71, and protective circuits to protect it from interference and transients, such as those caused by a nuclear event, as described further herein.

Figure 2:
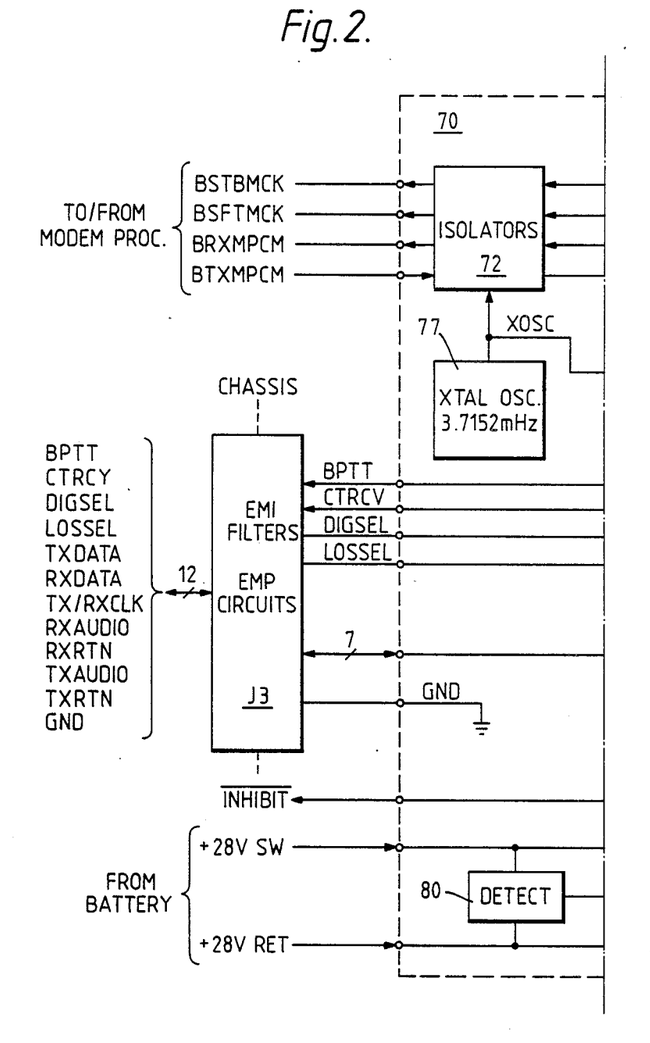
FIG. 2 is a schematic diagram of a digital array and an analog array on a carrier forming an integrated I/O interface subsystem for the interface unit of FIG. 1.

The I/O interface section 70, as shown in greater detail in FIG. 2, has a digital array 74, for interfacing digital signals to/from the modem processor subsystem 40 with digital signals for external digital transmission, and an analog array 75 and an associated CODEC 76, for interfacing digital signals to/from the modem processor subsystem 40 with analog signals for external analog transmission.

The I/O interface section 70 communicates with the modem processor subsystem 40 of the terminal via four isolated signal lines, i.e. two (transmit and receive) data lines and two (transmit and receive) clock lines. The external I/O connector J3 is a 13-pin connector. Other functional elements of the I/O interface section 70 include analog amplifiers for the audio signals to/from the external radio communication device, and compatible line drivers and receivers to/from the external modem.

The internal I/O port 72 connected to the modem processor subsystem 40 includes EMI isolator circuits for isolating the internal components of the terminal from EMI emissions. In accordance with a preferred embodiment of the invention, the external I/O port J3 is a single connector having protective EMI and EMP circuits incorporated for protection of the digital and analog I/O interfaces. The EMI filters are filter pins integral to the connector J3 and reduce high frequency interference emissions from the communication channels. Their capacitive loading—selected between 4,000 pf and 12,000 pf for analog and between 20,000 pf and 60,000 pf for digital—provides filtering for the analog signals and rise/fall time control for the digital signals. The EMP circuits provide protection against high voltage transients from the communication channels and do not affect the functional performance of the I/O interface.

Figure 5:
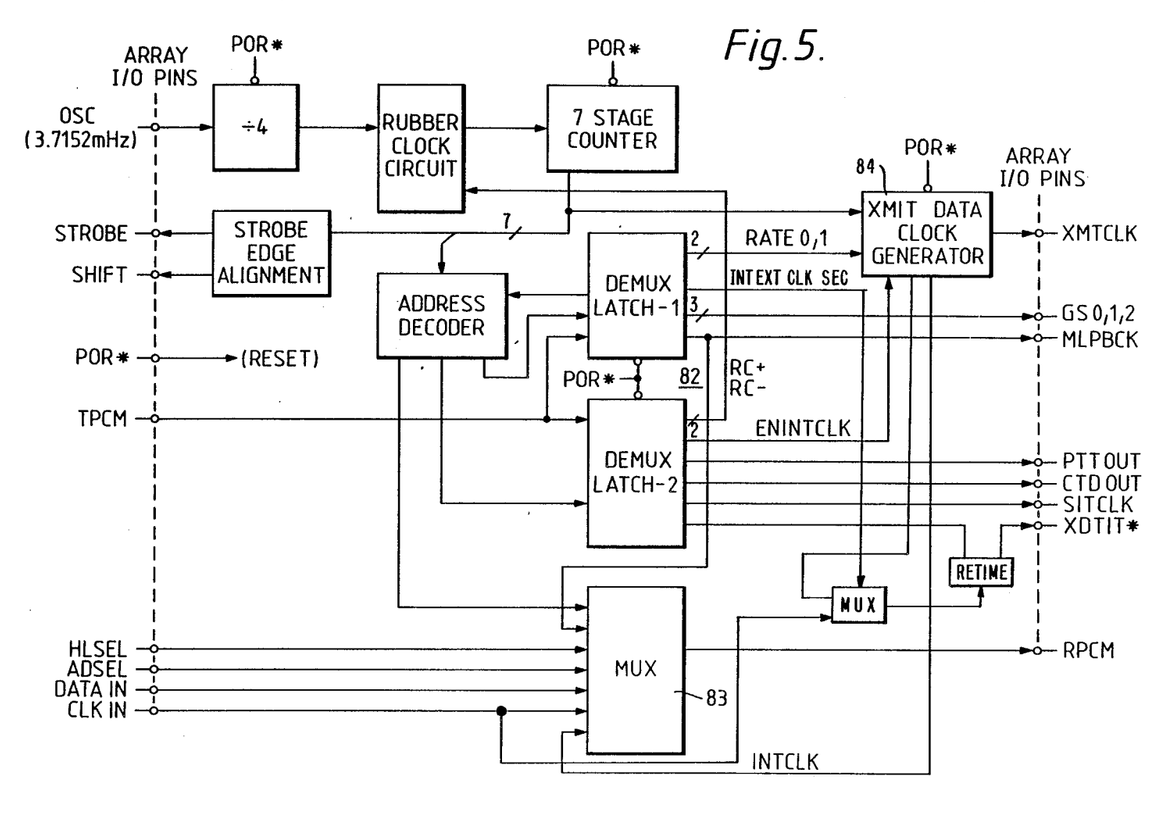
FIG. 5 is a detailed block diagram of the digital array used in the digital I/O interface.

A crystal oscillator 77 provides a 3.7152 MHz timing pulse to the digital array 74 where it is divided down to generate the 7200 Hz and 230.4 KHz clocks for the CODEC 76 and the 200 Hz to 2400 Hz data rate clocks for digital data transmission. The CODEC and data clocks are capable of being adjusted ±1% by virtue of a "rubber clock" feature. A block diagram of the various timing circuits within the digital array 74 is shown in FIG. 5.

The DC/DC converter 73 converts the +28 VDC of the battery power supply 61 to +5 VDC supply. A low voltage detector 78 and an overvoltage detector 79 provide stable voltage protection to the I/O interface section. The low voltage detector 78 senses when the output of the DC/DC converter is too low to support operation of the circuits in the I/O interface subsystem 71. A power-on-reset signal POR from the analog array 75, initially at logic "0", is set to logic "1" and applied to the digital array to provide orderly turn-on of the array. The overvoltage detector 79 limits the +5 VDC supply from exceeding DC levels that could damage their respective loads, including due to a malfunction within the DC/DC converter 73. The overvoltage protector circuit prevents such a failure from propagating into multiple failures at the loads.

For high-security application, a detector 80 and crowbar/reset circuit 81 are provided to cut off power supply to the I/O interface subsystem components. The detector 80 causes the INHIBIT signal to change from the inactive logic "1" state to logic "0". This causes crowbar circuit 81 to "crowbar", i.e. to cut off, the +5 VDC outputs of the DC/DC converter, which results in zero output voltage and current. When a timer in the event detector times out, the INHIBIT signal automatically returns to its inactive logic "1" state and the DC/DC converter is turned on with the crowbar off. The INHIBIT signal is also used to crowbar a DC/DC converter 73a for other components of the terminal 10.

Figure 6:
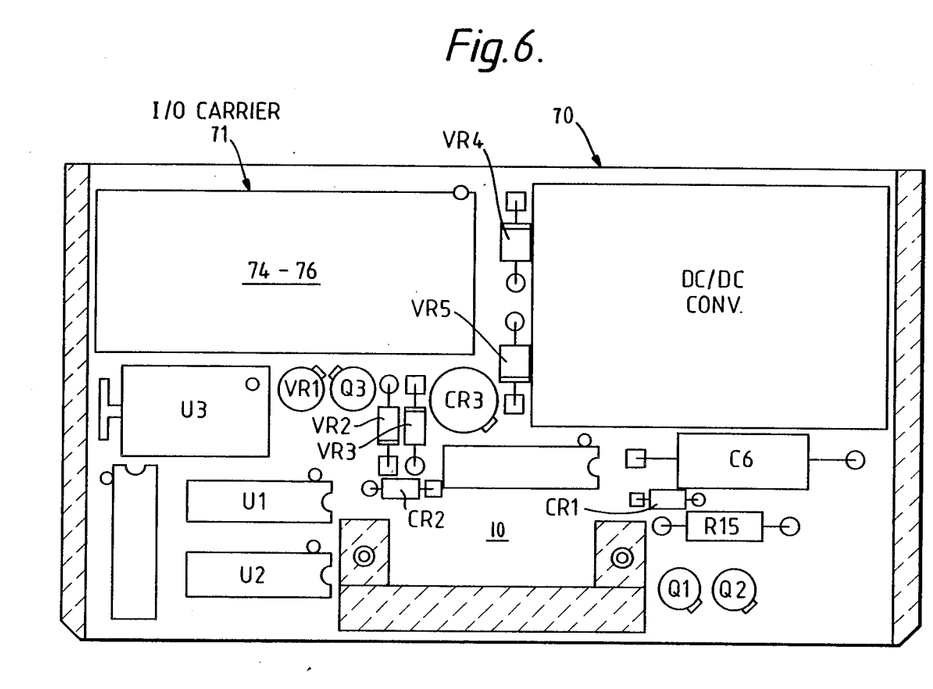
FIG. 6 is a layout diagram of the integrated I/O interface subsystem on a printed circuit board with a platform carrier for the digital and analog arrays.

As shown in FIG. 6, the analog array 75 is a 44-pin LCC, and the CODEC 76 and digital array 77 are 28-pin LCCs. They are mounted together with the isolator circuits for the internal I/O port and miscellaneous surface-mount discrete components on a 40-pin ceramic leaded carrier 91. The 40-pin carrier is, in turn, mounted on a printed circuit board 90 for the I/O interface section 70, together with the crystal oscillator 77, DC/DC converter 73, and additional discrete components. The printed circuit board 90 is mounted on the system board for the SVDT terminal 10.

Audio (Analog) I/O Circuits

Figure 3:
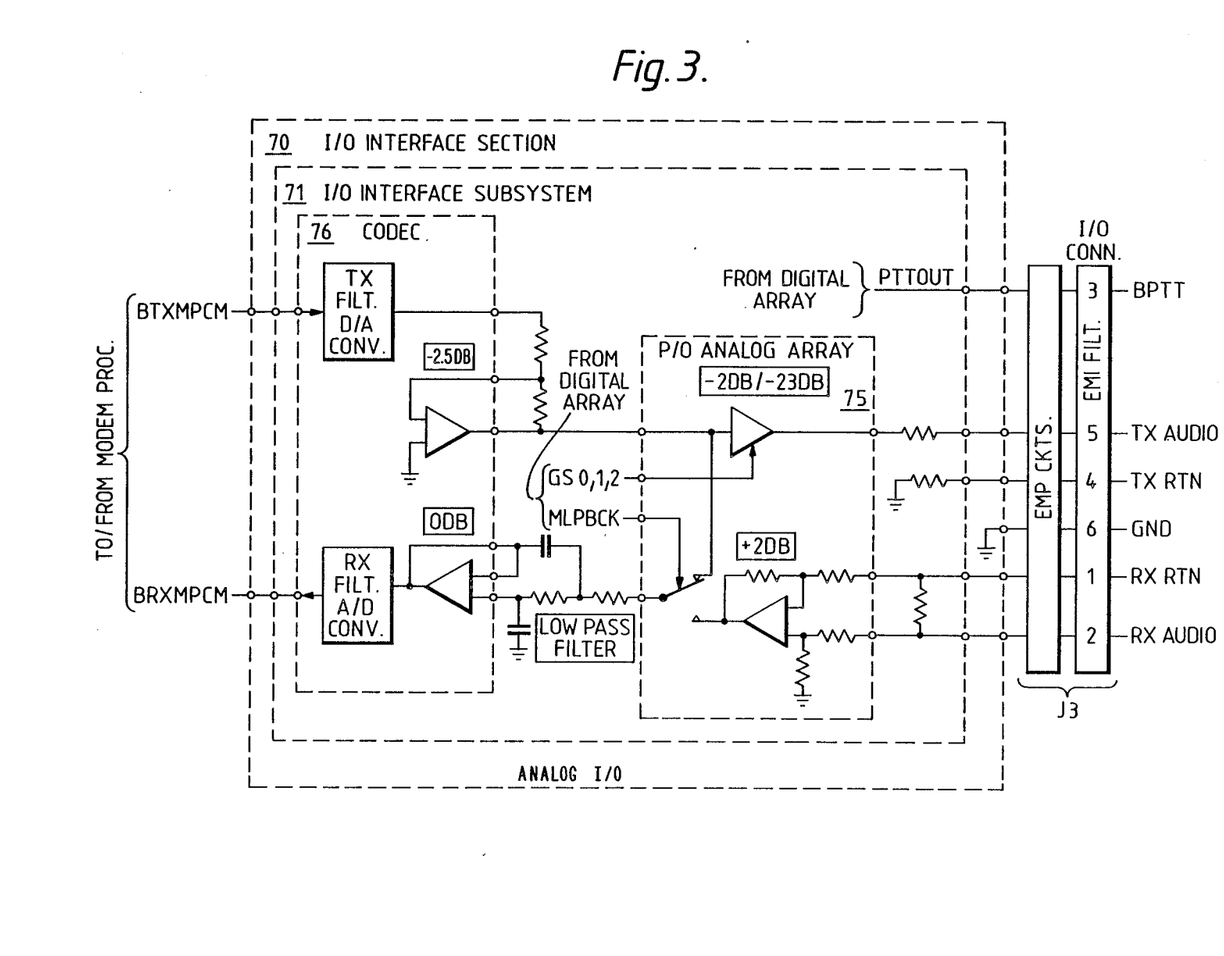
FIG. 3 is a diagram of the connections for the analog array and analog I/O interface of the integrated I/O interface.

In FIG. 3, the audio (analog) I/O circuits of the integrated I/O interface are shown providing the analog interface between the data lines BTXMPCM, BRXMPCM to/from the modem processor subsystem 40 and an external radio modem through pins 1-6 of the external I/O connector J3. The audio mode is selected by an open connection at pin 11 of the I/O connector, which causes the signal DIGSEL to be at logic "1".

The latter causes the analog I/O path to be enabled, and disables the digital I/O path.

For receiving audio signals from a radio transmission, plain text voice or a modulated signal (cipher text) is applied to pins 1 and 2 of the I/O connector J3. This audio signal is RXAUDIO with RXRTN being the return. The capacitances of the EMI filter pins provide some input low-pass filtering. The RXAUDIO signal is amplified by 2 dB in the analog array 75. The analog array output is applied to the CODEC 76 via a low-pass filter with a 3 dB cutoff at 4000 Hz. Within the CODEC, the audio signal is applied to additional 3.24 KHz low-pass and 150 Hz high pass filters before being A/D converted.

The resulting output serial data bit stream RPCM is applied through a buffer to the modem processor 40 via the lead BRXMPCM. This serial bit stream contains 8 bits of CODEC converted data, which are clocked out of the CODEC by 8 successive positive edges of SHIFT signals following a positive edge of the STROBE signal provided from the digital array 74. RPCM is combined with a second set of 8 bits of data from the digital array 74 representing the external clock signal RXCLK on pin 8, the internal clock rate of the digital array, and other control parameters. These 8 data bits are clocked onto RPCM by the next 8 successive positive edges of SHIFT signals.

Figure 4:
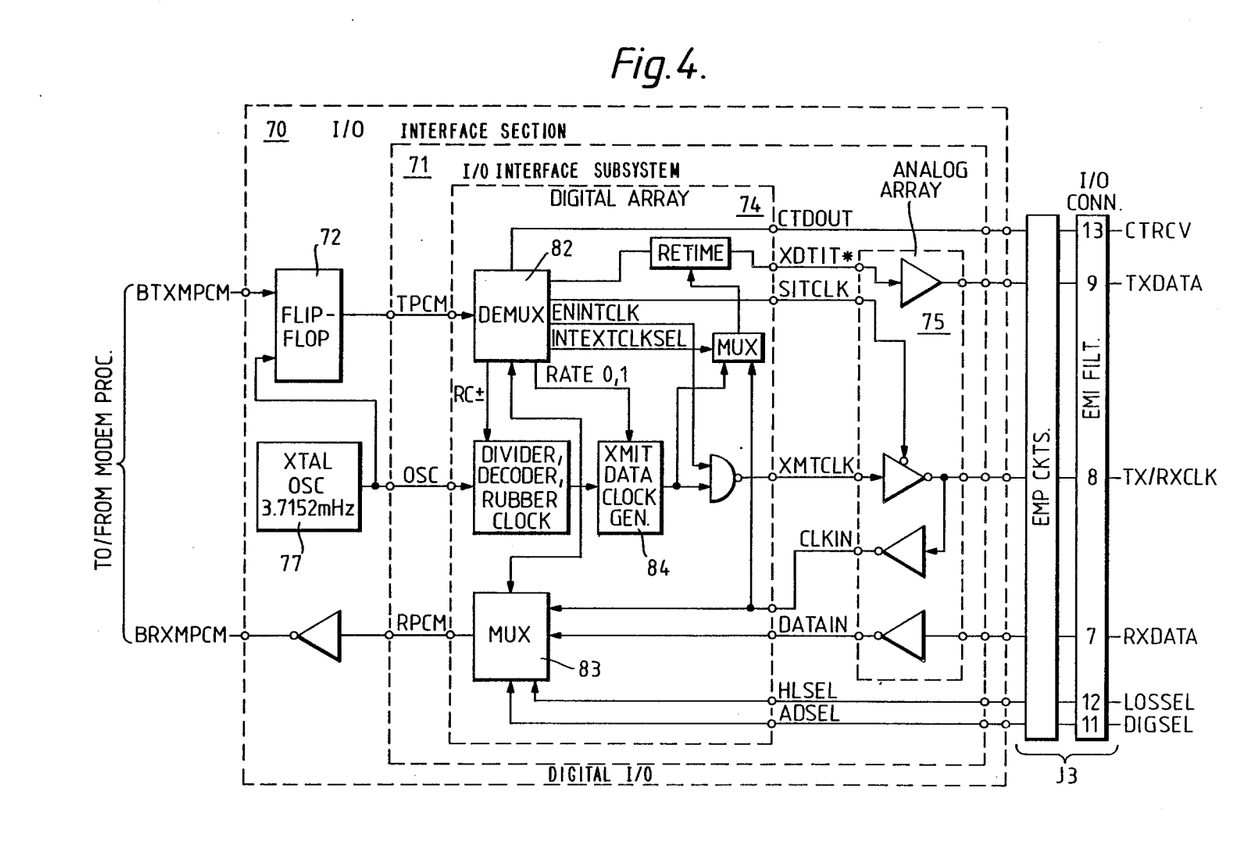
FIG. 4 is a diagram of the connections for the digital array and digital I/O interface of the integrated I/O interface.

Conversely, for audio transmission, the serial data bit stream BTXMPCM, containing the 16 data bits, is applied to the integrated I/O interface subsystem 71 from the modem processor 40 through internal I/O port 72, which includes flip-flop and inverter circuits (also designated as 72). As shown in FIGS. 2 and 4, the data stream is clocked out of the flip-flop 72, by the 3.7152 MHz clock provided from the oscillator circuit 77, as input TPCM to the digital array 74 and to the 8-bit, companding, u-law CODEC 76.

The first group of 8 bits are voice data bits which are ignored by the digital array 74, and are D/A converted by the CODEC 76. The voice data bits are clocked into the CODEC at a shift clock rate by 8 successive negative edges of SHIFT signals following a positive edge of the STROBE signal provided from the digital array 74. The SHIFT clock is at 230.4 KHz., and STROBE is at 7.2 KHz for either secure or plain text mode voice operation.

The resulting analog output signal of the CODEC 76 is the transmit analog signal outputted to the analog array 75. A low-pass filter and compensation circuit within the CODEC provide the necessary filtering for this path. The low-pass filter 3 dB cutoff frequency is 3.24 KHz. The transmit analog signal, either plain text voice or a modulated signal (cipher text), is outputted from the analog array and applied to pin 5 of the I/O connector J3. The return for this signal is TXRTN at pin 4 of the I/O connector. The TXAUDIO and TXRTN lines constitute a pseudo-balanced audio signal source of the I/O interface subsystem. The capacitances of the EMI filter pins incorporated within the I/O connector (4000 pf to 12,000 pf) together with the source and load impedances provide additional output low-pass filtering.

A second group of 8 bits of the serial data stream BTXMPCM is applied to the digital array 74 (see FIG. 2) where they are demultiplexed as control signals for various transmission parameters. The second group of 8 bits is actually two groups A and B which are multiplexed in the same time slot. Group A includes three control bits GS0, GS1, and GS2 for the transmit audio level, three control bits for the transmit data rate, and one bit to enable an audio loopback testing function. Group B of control bits controls the internal clock of the digital array, the transmit clock rate, a push-to-talk signal, and a cipher text indication signal.

The control parameters contained in the second 8 bits of data in the serial bit stream BTXMPCM from the modem processor 40 are demultiplexed in the digital array 74. As shown in FIG. 3, audio level signals GS0, GS1, and GS2 output from the digital array are applied to control the audio level of the line drivers of the analog array 75. The audio level is preferably adjustable in 3 dB steps over a 20 dB range. The analog loopback function switches the CODEC D/A output to the CODEC A/D input in the analog array 75, via control signal MLPBCK from the digital array. The loopback function allows bit integrity testing and monitoring the transmission of the TXAUDIO signal. A push-to-talk (PTT) output is provided at pin 3 of the I/O connector, which is a function of the PTT signal provided from the voice interface J1 of the SVDT terminal 10 (see FIG. 1) to the modem processor 40, and passed therefrom to the digital array in the serial bit stream BTXMPCM. The demultiplexed PTT signal from the digital array 74 produces a logic "1" for BPTT at pin 3. Pin 6 of the I/O connector is used for a ground connection.

Digital I/O Mode

In FIG. 4, the digital I/O circuits of the integrated I/O interface are shown providing the digital interface between the data lines BTXMPCM, BRXMPCM to/from the modem processor 40 and an external digital modem through pins 7-9 and 11-13 of the external I/O connector J3. The digital mode of I/O operation is selected when pin 11 of the I/O connector is grounded, i.e. the signal DIGSEL is a logic "0". Otherwise, an open circuit at pin 11 (no connection) indicates the analog mode.

For receiving data signals from the external digital modem, data signal RXDATA is applied from pin 7 of the I/O connector J3 to line receivers in the analog array 75, where it is converted to +5 VDC CMOS logic levels and applied to the digital array 74. The data signal DATAIN is multiplexed by MUX 83 and outputted from the digital array as RPCM, which is applied to an inverter and outputted as BRXMPCM to the modem processor 40.

Pin 8 of the I/O connector receives the RXCLK signal from the external modem. The RXCLK signal is applied to the analog array 75 and outputted as the CLKIN signal to the digital array 74, where it is multiplexed by MUX 83 into the serial data stream BRXMPCM to the modem processor 40. The LOSSEL and DIGSEL control signals received on pins 11 and 12 of the I/O connector are applied to the digital array 74 and multiplexed into the same serial data stream. A logic "0" (ground) at pin 12 indicates the LOS modem, whereas a logic "1" indicates the high frequency modem. A logic "0" (ground) at pin 11 indicates the digital mode, whereas a logic "1" indicates the analog mode. The LOSSEL signal is applied to the MUX 83 of the digital array as HLSEL, and the DIGSEL signal as ADSEL.

For digital transmission via the external digital modem, data and clock and other control signals at CMOS logic levels are obtained from the modem processor 40 via the serial data stream BTXMPCM. The data signals (first 8 bits) are applied to the digital array 74, where they are demultiplexed in DEMUX 82, then applied to the analog array 75, where they are amplified to digital modem levels via line driver circuits. The amplified signals are then applied to pin 9 of the I/O connector as transmit data signals TXDATA.

The clock and control signals on the same serial bit stream (second 8 bits) from the modem processor 40 are also demultiplexed in the digital array 74. These bits are used to enable the digital mode of operation, to set the transmit clock rate, and to output a cipher text signal at pin 13 of the I/O connector. The control signal at pin 13 is a logic "0" when the terminal is transmitting cipher text, and a logic "1" for plain text.

Referring in more detail to FIGS. 4 and 5, the serial data bit stream BTXMPCM from the modem processor 40 is input through flip-flop 72 to the digital array 74 at TPCM having the data bits in the first group of 8 bits and the clock and other control bits in the second group of 8 bits. The first group of data bits is demultiplexed by DEMUX 82 and output to the analog array 75 at XDTIT, where it is amplified to external modem levels and outputted as TXDATA at pin 9 of the I/O connector for transmission to the external digital modem. The capacitance (20,000 pf to 60,000 pf) of the EMI filter pins within the I/O connector together with the source impedance of the array line driver produces data rise/fall times of between 15 usec and 50 usec.

The second group of 8 bits of TPCM is demultiplexed by DEMUX 82. A SITCLK signal (logic "1") enables the transmit line driver of the analog array 75. A 2-bit-transmit data rate signal selects the data rate frequency of 400 Hz, 600 Hz, or 2400 Hz. It is applied to a transmit data clock generator 84, which receives the 3.7152 MHz clock signal of the oscillator 77 and, by an enabling signal ENINTCLK, outputs the selected transmit clock signal XMTCLK to the analog array 75. The resulting signal is outputted as TXCLK at pin 8 of the I/O connector. A INTEXTCLKSEL signal selects an external clock (CLKIN) or internal clock which is outputted as XDTIT to the analog array.

A ground (logic "0") at pin 12 of the I/O connector selects the LOS modem (radio) or the external digital modem, and a ground (logic "0") at pin 11 selects the external digital modem. An open connection (logic "1") at pin 12 selects the HF modem. The truth table for external device selection is summarized as follows:

| Indicated Device | LOSSEL (Pin 12) | DIGSEL (Pin 11) |
|---|---|---|
| HF Modem (Radio) | 1 | X |
| LOS Modem (Radio) | 0 | 1 |
| Digital Modem (Ext. Modem) | 0 | 0 |

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

We claim:

1. An integrated input/output interface, connectable with an external analog communication device and with an external digital communication device, for a communication terminal having a digital processor for handling voice and data signals, comprising:
    an input/output interface subsystem installed in the terminal;
    first connecting means for connecting the input/output interface subsystem to the digital processor of the terminal;
    second connecting means for connecting the input/output interface subsystem to the external analog communication device and to the external digital communication device;
    said terminal being provided with means, including said digital processor, for handling voice and data signals in digital form, wherein said terminal digital processor transmits and receives said digital voice and data signals to and from said input/output interface section via said fist connecting means, said digital voice and data signals including a first group of data bits and a second group of control bits;
    means in said input/output interface subsystem providing a digital interface mode, including a digital array connected between said first and second connecting means for interfacing digital signals to and from the terminal digital processor with digital signals to and from the external digital communication device; and
    means in said input/output interface subsystem providing an analog interface mode, including an analog array connected between said first and second connecting means for interfacing digital signals to and from the terminal digital processor with analog signals to and from the external analog communication device.

2. The integrated input/output interface according to claim 1, wherein said digital array and said analog array including a voice signal digital array and said analog array including a voice signal digital coder are mounted on one carrier platform, which in turn is mounted o a printed circuit board for said input/output interface subsystem.

3. The integrated input/output interface according to claim 1, wherein said second connecting means is a single connector having a plurality of pins, including a first group of pins for audio signals, a second group of pins for digital signal, and one pin which transmits a signal indicating whether the analog or the digital interface mode is selected.

4. The integrated input/output interface according to claim 3, wherein said single second connector is provided with protective circuits for electromagnetic interference incorporated therein.

5. The integrated input/output interface according to claim 1, wherein said means providing said analog interface mode, for transmitting voice signals from said terminal to the external analog communication device, includes: a voice signal digital coder receiving a first group of voice data bits from said terminal digital processor and converting them to a transmit audio signal; said analog array including line drivers for amplifying said transmit audio signal and outputting it to the external analog communication device through said second connecting means; and said digital array receiving a second group of control bits from said terminal digital processor and outputting at least an audio level control signal to control the line drivers of said analog array.

6. The integrated input/output interface according to claim 5, wherein said analog array includes means for looping back the transmit audio signal from the output of said voice signal digital coder to a return input of said voice signal digital coder for monitoring said analog interface mode.

7. The integrated input/output interface according to claim 1, wherein said means providing said analog interface mode, for receiving voice signals in analog form from the external analog communication device, includes: said analog array receiving an input analog voice signal through said second connecting means from the external analog communication device and amplifying it as a received analog signal; a voice signal digital coder receiving the received analog signal from said analog array and converting it to a first group of voice data bits in a serial bit stream; and said digital array generating internal clock signals for clocking out said serial bit stream from said voice signal digital coder to said terminal digital processor.

8. The integrated input/output interface according to claim 1, wherein said means providing said digital interface mode, for transmitting digital data signals to the external digital communication device, includes: said digital array receiving a first group of data bits from said terminal digital processor and demultiplexing them to a transmit data signal; said digital array receiving a second group of control bits from said terminal digital processor and outputting at least a transmit data clock signal to said analog array; and said analog array including line drivers for amplifying said transmit data signal and said transmit data clock signal and outputting them to the external analog communication device through said second connecting means.

9. The integrated input/output interface according to claim 8, wherein said second group control bits of said serial bit stream includes a cipher text bit, and said digital array includes means for outputting a cipher text signal to said second connecting means based thereon to distinguish from plain text.

10. The integrated input/output interface according to claim 1, wherein said means providing said digital interface mode, for receiving digital data signals from the external digital communication device, includes: said analog array receiving an input digital data signal and an input digital data clock signal through said second connecting means from the external digital communication device and amplifying them; said digital array receiving the amplified digital data signal and data clock signal and multiplexing them in a serial bit stream to said terminal digital processor.

11. The integrated input/output interface according to claim 1, wherein said input/output interface section includes a voltage converter for converting an external power supply to an internal voltage supply to said input/output interface subsystem.

12. The integrated input/output interface according to claim 11, wherein said input/output interface section further includes a low voltage detector and an overvoltage detector for cutting off said internal voltage supply if an abnormal voltage transient is detected.

13. The integrated input/output interface according to claim 1, wherein said first connecting means includes isolator circuits for isolating the terminal digital processor from electromagnetic interference transients from said input/output interface section.

14. The integrated input/output interface according to claim 1, wherein said second group of control bits includes a push-to-talk bit, and said input/output interface subsystem includes means for outputting a push-to-talk signal to said second connecting means based thereon.

15. The integrated input/output interface according to claim 1, wherein said second connecting means is connected to an external high frequency modem and a low frequency modem, and includes another pin for transmitting a signal indicating whether the high-frequency modem or the low frequency modem is selected.

* * * * *